United States Patent Office 2,734,221
Patented Feb. 14, 1956

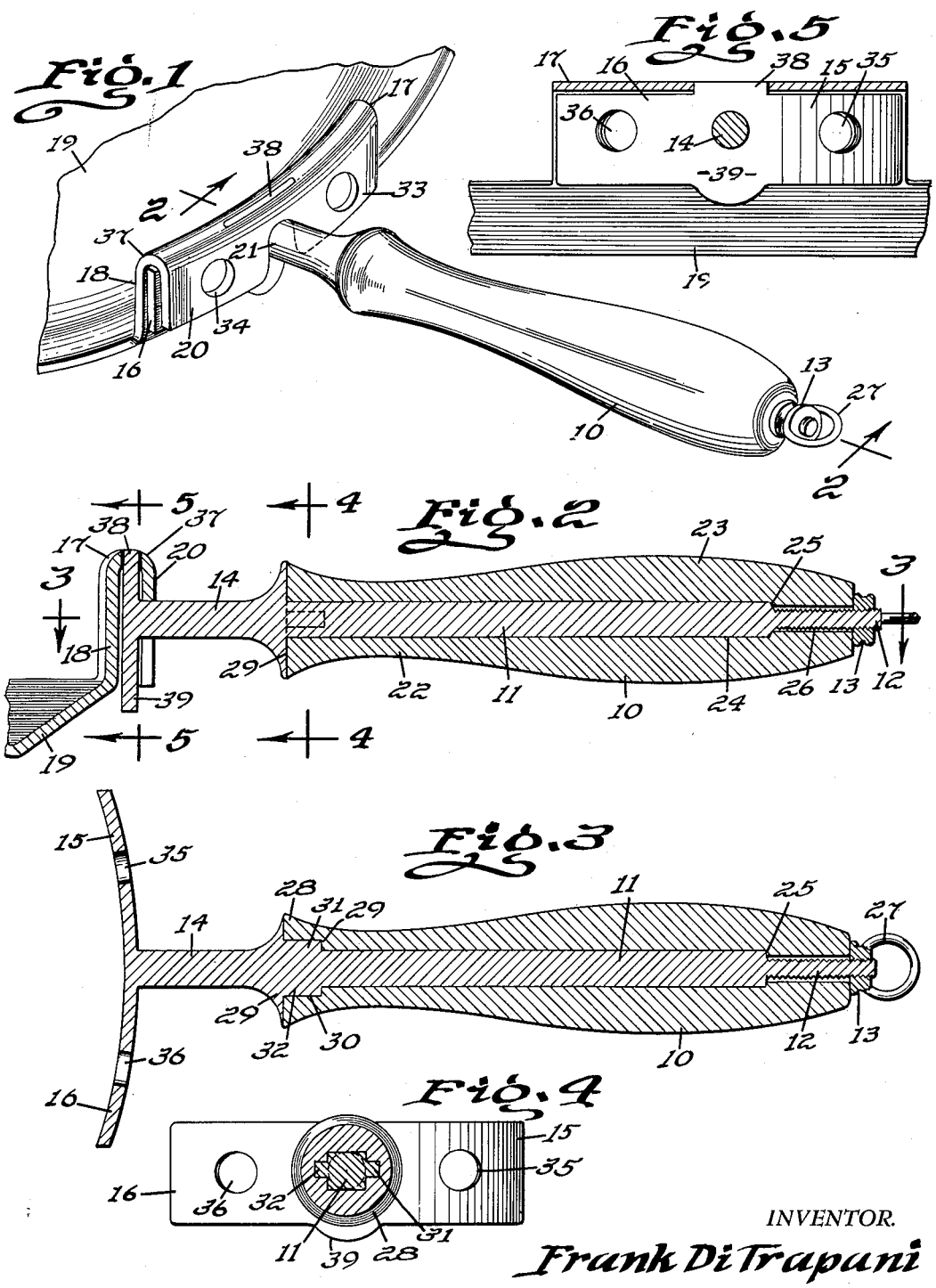

2,734,221

DETACHABLE HANDLE

Frank Di Trapani, Boston, Mass.

Application June 10, 1954, Serial No. 435,701

1 Claim. (Cl. 16—114)

This invention relates to a handle particularly adapted for use in holding cooking utensils, such as a broiler, where it is desirable to place a utensil in close proximity to a flame, such as a burner, and in particular, a handle having a core or bolt extended through a substantially cylindrical gripping portion with an arcuate plate carried by an extended end of the bolt and with the arcuate plate adapted to coact with an arcuate U-shaped clip formed with inner and outer walls connected with an arcuate section at the upper end and with a stem of the handle adapted to be positioned in a notch in the outer wall of the clip.

The purpose of this invention is to provide means for detachably connecting a handle to an object, such as a kitchen utensil, wherein the handle is provided with laterally disposed supporting arms that prevent twisting or turning of a utensil carried thereby.

Various types of connecting elements have been provided on ends of handles whereby cooking utensils and other devices may be picked up and carried with the handle, however, where relatively large utensils, such as frying pans, broilers, and the like are carried with a detachable handle, the utensil has a tendency to twist and it is difficult to hold the device with products thereon in a horizontal position. With this thought in mind, this invention contemplates a handle for a cooking utensil, such as a broiler, wherein the broiler is provided with a U-shaped clip providing a continuous arcuate slot and the handle is provided with an arcuate plate that is adapted to be inserted in the clip whereby the device may be held without danger of twisting and turning.

The object of this invention is, therefore, to provide detachable means on the end of a handle whereby laterally extended arms in the detachable means prevent twisting of a utensil carried by the handle.

Another object of the invention is to provide means for connecting a handle to a cooking utensil whereby twisting movements of the utensil are restricted and wherein the handle is freely held without screws, bolts, or other mechanical fastening elements.

A further object of the invention is to provide a detachable handle for a broiler or other cooking utensil in which the handle and connecting elements provide a simple and economical device.

With these and other objects and advantages in view, the invention embodies a substantially cylindrical sleeve providing a handle having an enlarged gripping portion spaced from one end, a bolt extended through the sleeve with a nut threaded on the outer end and with an arcuate plate having laterally disposed arms carried by the opposite end, and a U-shaped clip adapted to be positioned on one edge of a utensil, the clip being formed to correspond with the curvature of the plate of the handle.

Other features and advantages of the invention will appear from the following description taken in connection with the drawings, wherein:

Figure 1 is a perspective view illustrating the improved handle, showing the handle attached to a broiler with part of the broiler broken away.

Figure 2 is a longitudinal section through the handle being taken on line 2—2 of Figure 1.

Figure 3 is a sectional plan through the handle taken on line 3—3 of Figure 2.

Figure 4 is a cross section through the handle taken on line 4—4 of Figure 2.

Figure 5 is also a cross section through the extended end of the stem of the handle, said section being taken on line 5—5 of Figure 2.

Referring now to the drawings wherein like reference characters denote corresponding parts, the improved detachable handle of this invention includes a substantially cylindrical sleeve 10, a bolt 11 extended longitudinally through the sleeve and having a threaded stem 12 with a nut 13 thereon on one end and a shank 14 with an arcuate plate having laterally disposed arms 15 and 16 extended from the opposite end, and a U-shaped clip 17 having an inner wall 18 adapted to be positioned on a pan or broiler 19, and an outer wall 20 having a vertically disposed notch 21 therein.

The sleeve 10 is provided with a section 22 of reduced diameter and a enlarged gripping section 23 and, as illustrated in Figure 2, the bolt 11 extends through an opening 24 extended longitudinally through the sleeve, and in which is a shoulder 25, providing an end section 26 of reduced diameter.

The threaded stem 12 of the bolt 11 extends from the outer end of the handle and a nut 13, which is threaded on the stem, is provided with a ring 27 by which the handle may be suspended from a hook or the like.

The opposite end of the sleeve is provided with a bead 28 that is positioned against a shoulder 29 of the bolt and the end on which the bead is positioned is provided with recesses 30 and the recesses are adapted to receive keys 31 and 32, respectively, on the sides of the bolt 11.

With the bolt secured in the sleeve 10, the arms or wings 15 and 16 are adapted to hold a pan or broiler, such as the device 19, in a horizontal position whereby a broiler may readily be picked up, removed and replaced without danger of dropping products therefrom.

The outer and inner plates 20 and 18 are provided with spaced openings 33 and 34 that are positioned to register with openings 35 and 36 in the arms 15 and 16, and these openings are provided to reduce the amount of material, thereby reducing the weight of the handle and at the same time permitting circulation of air to keep the parts cool or prevent overheating.

The upper edges of the walls 18 and 20 of the clip 17 are connected with an arcuate section 37 in which an opening or slot 38 is provided which facilitates circulation to prevent overheating and which is also adapted to receive an arcuate projection 39 on one edge of the arcuate plate or bar forming the arms 15 and 16.

The bolt 11 may be square, as shown, or of other suitable shape in cross section and with the handle or sleeve 10 clamped against the shoulder 29 the sleeve is rigidly clamped in position on the handle.

The clip 17 may be positioned on a broiler or other utensil, or the clip may be provided as a separate unit and welded or attached to a broiler or frying pan by other means.

With the parts designed and assembled in this manner, a handle is provided that may readily be attached to a utensil, such as a frying pan or broiler, by inserting the arms 15 and 16 in the slot between the inner plate 18 and outer plate 20 and with the shank 14 in the notch 21. With the utensil held in this manner, products may be retained thereon without danger of the utensil turning and dropping the products. The handle is adapted to be inserted in the clip and secured therein without bolts, nuts, or other fastening means, and is also adapted to be readily removed by pressing the handle with the arms 15 and 16 downwardly.

With the projection 39 positioned as shown and described, the handle may be turned with the projection extended downwardly, as shown in Figures 2 and 5, or with the projection extended upwardly wherein the projection 39 extends through the slot 38 in the arcuate section 37 of the clip.

It will be understood that modifications, within the scope of the appended claim, may be made in the design and arrangement of the parts without departing from the spirit of the invention.

What is claimed is:

In a detachable handle for a cooking utensil having a U-shaped clip embodying an inner wall and an outer wall provided with a vertically disposed notch therein, there being openings in said outer wall, an arcuate section interconnecting said walls and provided with a slot, said handle embodying a sleeve, a bolt extending longitudinally through said sleeve and having a threaded stem on one end thereof, a securing element arranged in threaded engagement with said stem, a shank extending from the other end of said bolt and projecting through said notch, an arcuate plate extended from said shank and defining a pair of laterally disposed arms arranged in engagement with said clip, and said arms being interposed between the walls of said clip, a projection on the upper edge of said plate whereby said projection extends into said slot, said sleeve being provided with a section of reduced diameter and an enlarged gripping section, there being a shoulder on said bolt, said sleeve having a bead abutting said shoulder, there being recesses in said sleeve adjacent said bead, and keys extended from said bolt and seated in said recesses for preventing relative rotation between said bolt and sleeve.

References Cited in the file of this patent

UNITED STATES PATENTS

| | | |
|---|---|---|
| 399,998 | Lobach | Mar. 19, 1889 |
| 603,857 | Perrote | May 10, 1898 |
| 933,963 | Edwards | Sept. 14, 1909 |
| 1,317,715 | Luttringhaus | Oct. 7, 1919 |
| 1,742,914 | Holden | Jan. 7, 1930 |
| 1,900,565 | Kircher | Mar. 7, 1933 |
| 2,284,748 | Koreneck | June 2, 1942 |